(12) United States Patent
Su et al.

(10) Patent No.: US 8,810,712 B2
(45) Date of Patent: Aug. 19, 2014

(54) CAMERA SYSTEM AND AUTO FOCUS METHOD

(75) Inventors: Wen-Yueh Su, Taoyuan County (TW);
Wei-Ting Liu, Taoyuan County (TW);
Yu-Chun Peng, Taoyuan County (TW)

(73) Assignee: HTC Corporation, Taoyuan (TW)

(*) Notice: Subject to any disclaimer, the term of this patent is extended or adjusted under 35 U.S.C. 154(b) by 260 days.

(21) Appl. No.: 13/354,879

(22) Filed: Jan. 20, 2012

(65) Prior Publication Data

US 2013/0188089 A1 Jul. 25, 2013

(51) Int. Cl.
*H04N 5/232* (2006.01)
*G06K 9/40* (2006.01)

(52) U.S. Cl.
USPC .......................................... 348/345; 382/255

(58) Field of Classification Search
USPC ................. 348/335, 345, 347–349, 353–356; 382/254, 255
See application file for complete search history.

(56) References Cited

U.S. PATENT DOCUMENTS

| | | | |
|---|---|---|---|
| 8,325,265 B2* | 12/2012 | Chen | 348/335 |
| 2006/0109370 A1* | 5/2006 | Yamazaki | 348/345 |
| 2006/0198623 A1 | 9/2006 | Ono | |
| 2010/0271536 A1* | 10/2010 | Campbell | 348/345 |
| 2011/0261252 A1 | 10/2011 | Chen | |
| 2011/0292275 A1 | 12/2011 | Kawamura | |
| 2012/0105575 A1* | 5/2012 | Silveira | 348/36 |
| 2012/0169849 A1* | 7/2012 | Ferren | 348/46 |
| 2012/0270596 A1* | 10/2012 | Los | 455/556.1 |
| 2012/0294597 A1* | 11/2012 | Shabtay et al. | 396/75 |

FOREIGN PATENT DOCUMENTS

| | | |
|---|---|---|
| EP | 2 247 095 A2 | 11/2010 |
| JP | 4777087 A | 7/2011 |
| TW | 201143384 A1 | 12/2011 |

* cited by examiner

*Primary Examiner* — Timothy J Henn
(74) *Attorney, Agent, or Firm* — Birch, Stewart, Kolasch & Birch, LLP

(57) ABSTRACT

The invention provides a camera system. In one embodiment, the camera system comprises a camera module and a processor. The camera module photographs a target object according to a focal length to generate an image. The processor comprises an extending-lens-depth-of-filed (EDOF) module and an auto focus module. The EDOF module processes the image according to an EDOF process to generate an EDOF image. The auto focus module adjusts the focal length of the camera module according to an auto focus process.

15 Claims, 7 Drawing Sheets

CAMERA SYSTEM AND AUTO FOCUS METHOD

BACKGROUND OF THE INVENTION

1. Field of the Invention

The invention relates to cameras, and more particularly to auto focus function of cameras.

2. Description of the Related Art

A lens-depth-of-field (DOF) represents a distance range in which objects of an image have a higher clarity than a threshold clarity. When a camera system generates an image with a specific focal length, objects with a distance range from the camera system are clear in the image, and other objects outside of the distance range are blurry in the image. Referring to FIG. 1A, a schematic diagram of a lens-depth-of-field of a camera system 100 is shown. The camera system 100 photographs objects 101, 102, and 103 according to a specific focal length. Assume that the specific focal length corresponds to a distance between the object 102 and the camera system 100. The object 102 is therefore clear in an image generated by the camera system 100. When a distance between an object and the camera system 100 falls to the distance range between distances D1 and D2, the object has a higher clarity than a clarity threshold of the image. The distance range between distances D1 and D2 is referred to as a lens-depth-of-field (DOF).

Because the distance between the object 101 and the camera system 100 is less than the distance D1, the object 101 in the image has a lower clarity than the clarity threshold and is blurred. Similarly, because the distance between the object 103 and the camera system 100 is greater than the distance D2, the object 103 in the image has a lower clarity than the clarity threshold and is blurred. Thus, when the camera 100 wants to photograph clear images of the objects 101 and 103, the focal length of the camera system 100 is needed to be adjusted.

Extending les-depth-of-filed (EDOF) is a new technology which uses image processing techniques to improve the clarity of objects in an image and extend the DOF of the image. Referring to FIG. 1B, a schematic diagram of an extending lens-depth-of-field of a camera system 150 is shown. The camera system 150 photographs the objects 161, 162, and 163 according to a specific focal length to obtain an image, and then uses an EDOF process to improve the clarity of the objects 161, 162, and 163 in the image. Assume that the specific focal length corresponds to a distance between the object 162 and the camera system 150. The object 162 is therefore clear in the image generated by the camera system 150. The image is processed by the EDOF process, the depth-of-field of the image is extended from the distance range D1~D2 shown in FIG. 1A to the distance range D1'~D2'. Because the locations of the objects 161 and 163 fall in the distance range D1'~D2', then the clarity of the objects 161 and 162 in the processed image is also higher than that of the clarity threshold.

An auto focus technology can automatically adjust a focal length of a camera system to improve clarity of an image. A conventional camera system with an auto focus function requires a long time period for adjusting the focal length, delaying photographing of images and leading to inconvenience for users. If the EDOF technology is used in a camera system to shorten the time period required by the auto focus function in adjustment of the focal length, the performance of the camera system can be improved. A camera system which combines the benefits of the auto focus function and the EDOF technology is therefore required.

BRIEF SUMMARY OF THE INVENTION

The invention provides a camera system. In one embodiment, the camera system comprises a camera module and a processor. The camera module photographs a target object according to a focal length to generate an image. The processor comprises an extending-lens-depth-of-filed (EDOF) module and an auto focus module. The EDOF module processes the image according to an EDOF process to generate an EDOF image. The auto focus module adjusts the focal length of the camera module according to an auto focus process.

The invention also provides an auto focus method. In one embodiment, a camera system comprises a camera module, an extending-lens-depth-of-field (EDOF) module, and an auto focus module. First, whether a distance between a target object and the camera system is greater than a predetermined threshold is determined. When the distance between the target object and the camera system is greater than the predetermined threshold, the camera module is controlled to directly photograph the target object without adjusting a local length of the camera module to obtain an image. When the distance between the target object and the camera system is less than the predetermined threshold, after the auto focus module adjusts the focal length of the camera module, the camera module is controlled to photograph the target object to obtain the image. The image is processed with the EDOF module according to an EDOF process to generate an EDOF image with a higher clarity than that of a clarity threshold.

The invention also provides an auto focus method. In one embodiment, a camera system comprises a camera module, an extending-lens-depth-of-field (EDOF) module, and an auto focus module. First, a distance between the camera system and an object is classified into a plurality of distance ranges, wherein a plurality of predetermined focal length values respectively corresponding to the distance ranges are set. A target predetermined focal length value is then selected from the predetermined focal length values. A focal length of the camera module is then adjusted to be the target predetermined focal length value with the auto focus module. A target object is then photographed to obtain an image with the camera module. The image is then processed according to an EDOF process with the EDOF module to obtain an EDOF image. When clarity of the target object shown in the EDOF image is higher than that of a clarity threshold, the EDOF image is output. When the clarity of the target object shown in the EDOF image is less than that of the clarity threshold, the selecting step, the adjusting step, the photographing step, and the processing step are repeated until the clarity of the target object shown in the EDOF image is higher than that of the clarity threshold.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
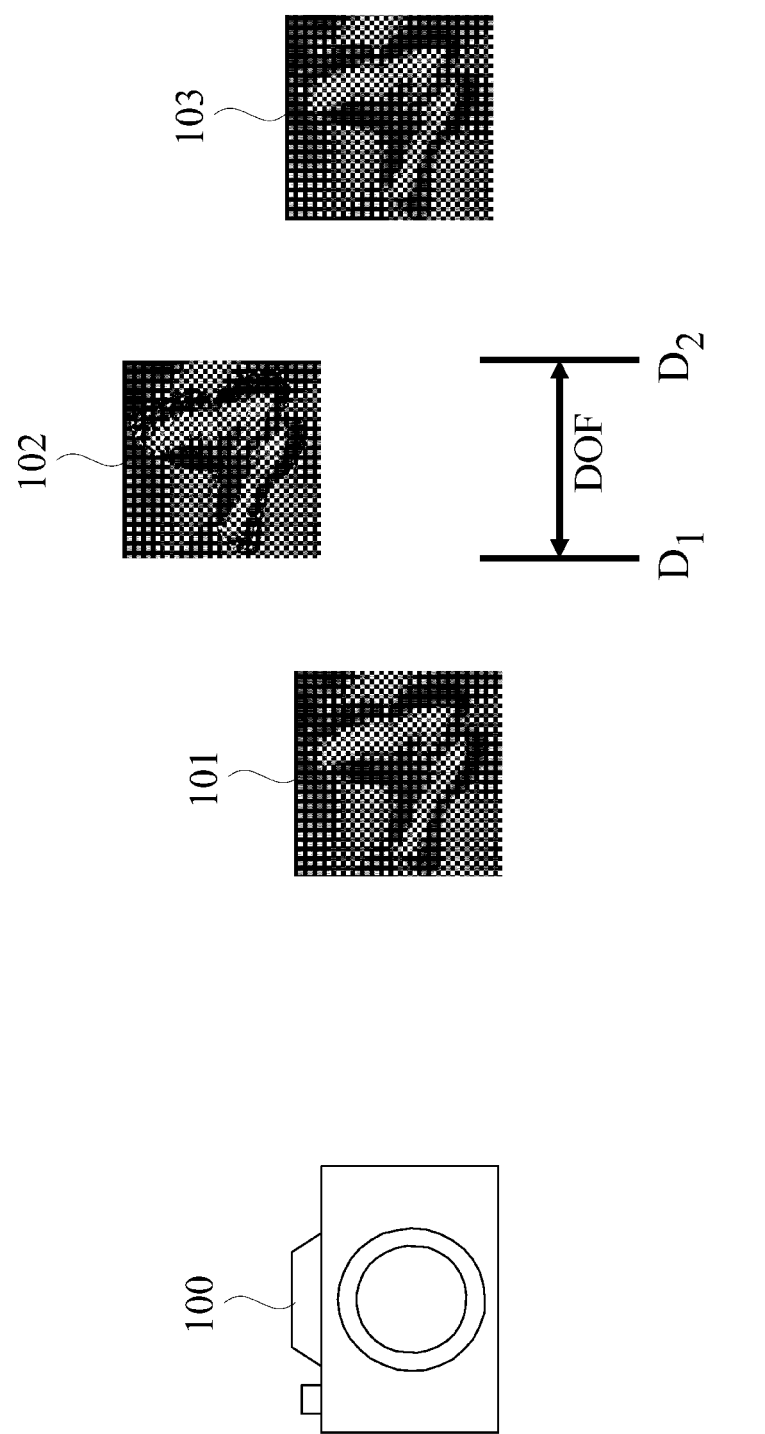
FIG. 1A is a schematic diagram of a lens-depth-of-field of a camera system.
Figure 1B:
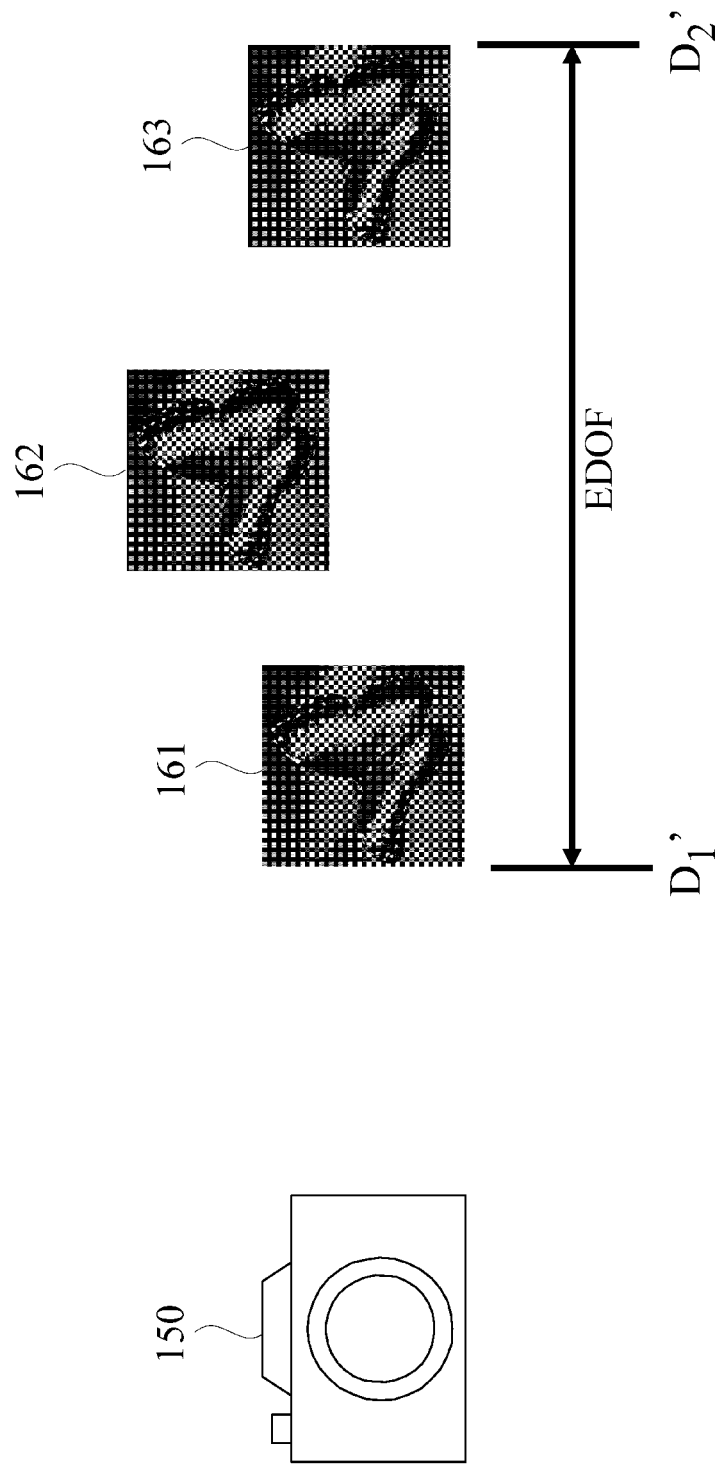
FIG. 1B is a schematic diagram of an extending lens-depth-of-field of a camera system.
Figure 2:
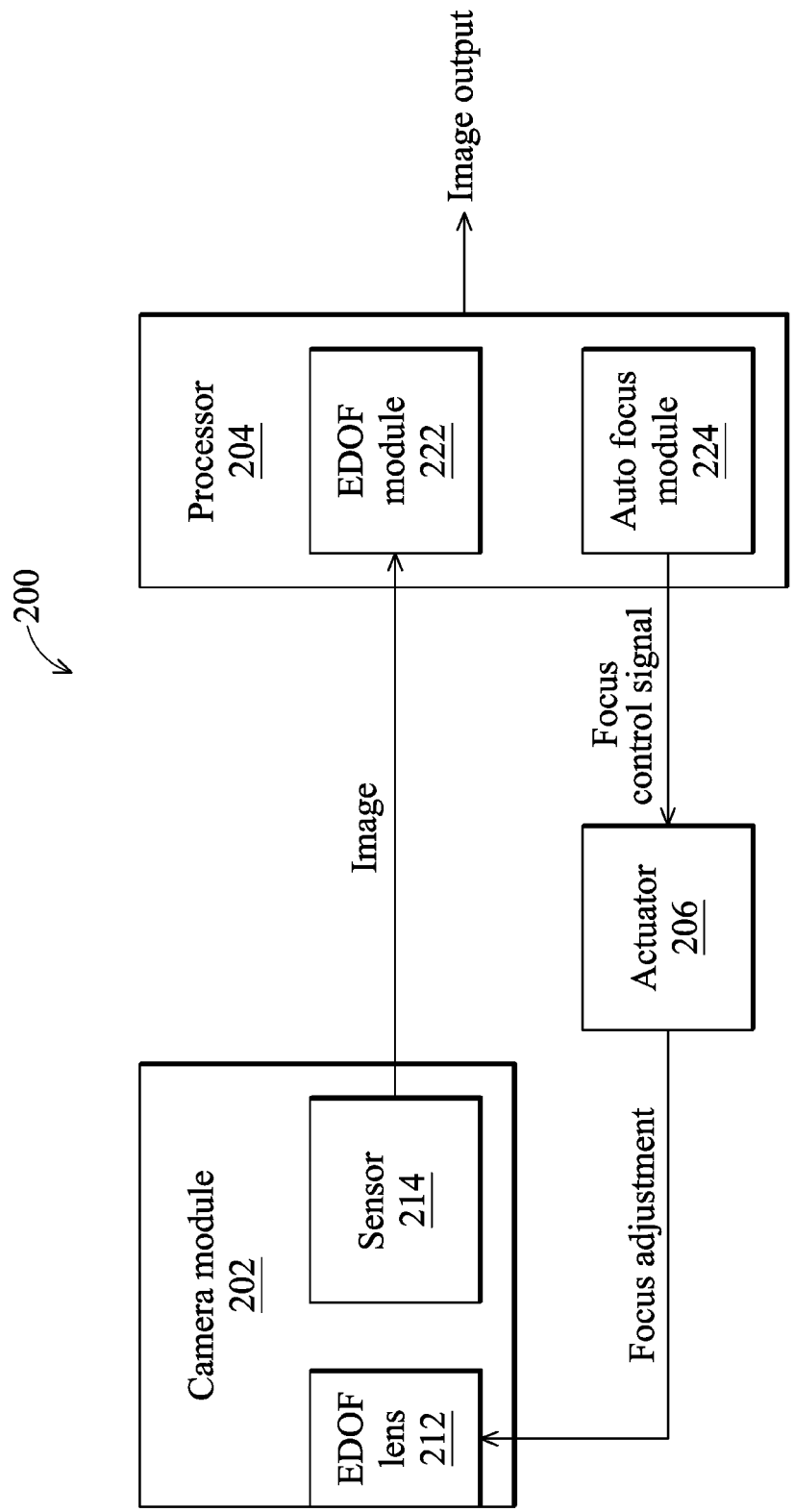
FIG. 2 is a block diagram of a camera system according to the invention.

Referring to FIG. 2, a block diagram of a camera system 200 according to the invention is shown. In one embodiment, the camera system 200 comprises a camera module 202, a processor 204, and an actuator 206. The processor 204 comprises an extending lens-depth-of-field (EDOF) module 222 and an auto focus module 224. In one embodiment, the EDOF module 222 and the auto focus module 224 are program executed by the processor 204. In another embodiment, the EDOF module 222 and the auto focus module 224 are physical circuits. First, the auto focus module 224 uses an auto focus process to send a focus control signal to adjust a focal length of the camera module 202. The actuator 206 then adjusts the focal length of the camera module 202 according to the focus control signal received from the processor 204. The camera module 202 comprises an EDOF lens 212 and a sensor 214. The EDOF lens 212 projects an image of outer objects according to a focal length on the sensor 214. The sensor 214 then captures the image projected thereon to generate image data. In one embodiment, the EDOF lens 212 has a large aperture to improve clarity of the image. The camera module 202 then sends the image data to the processor 204. The EDOF module 222 then uses an extending lens-depth-of field (EDOF) process to process the image data to generate an EDOF image. The EDOF image processed by the EDOF module 222 has an extended lens-depth-of-field and the objects shown in the EDOF image therefore has a high clarity. The processor 204 then performs other image processing processes on the EDOF image and then outputs the processed image.

Figure 3:
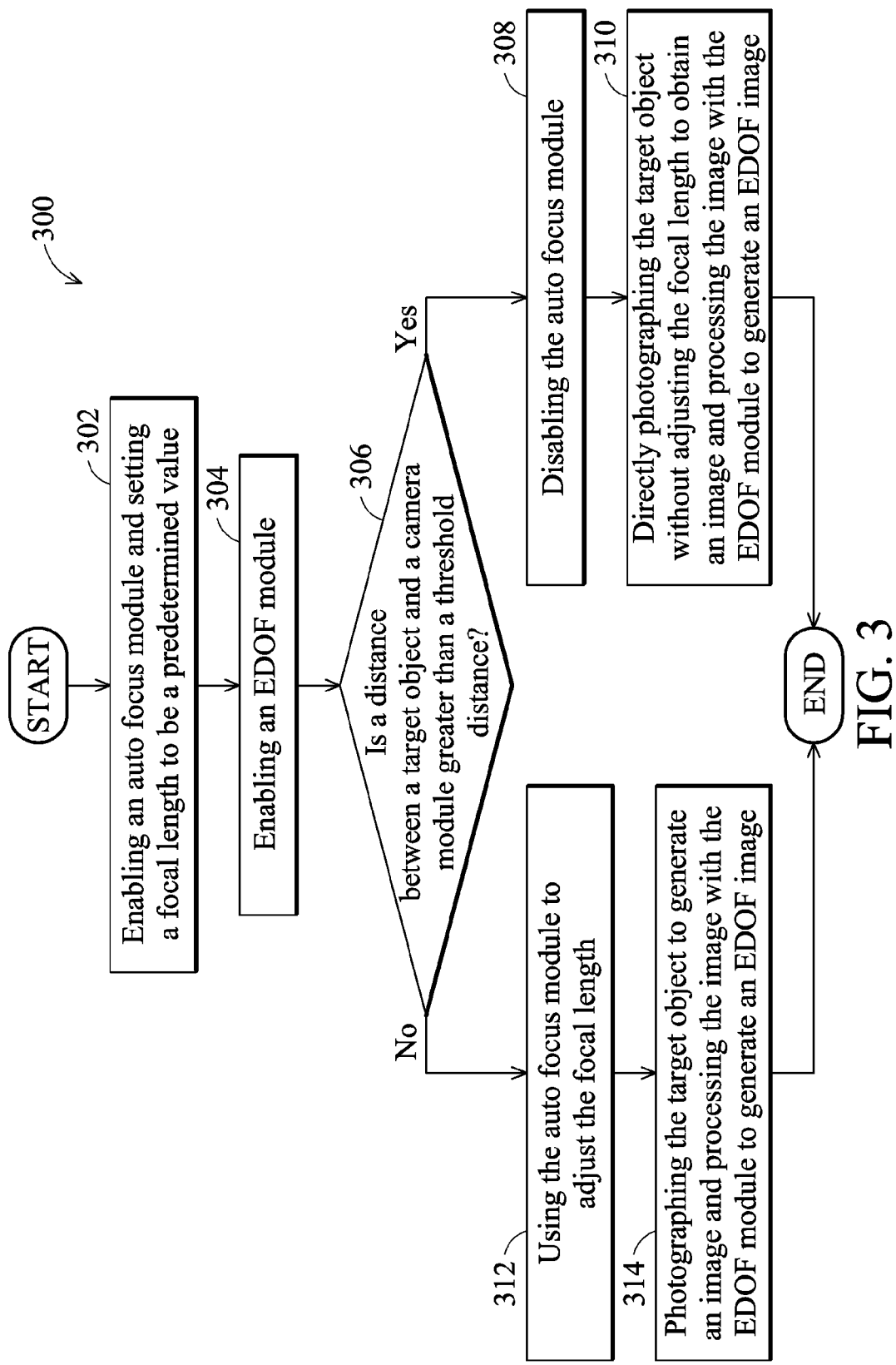
FIG. 3 is a flowchart of a first embodiment of an auto focus method according to the invention.

Referring to FIG. 3, a flowchart of a first embodiment of an auto focus method 300 according to the invention is shown. First, the processor 204 enables the auto focus module 224 and controls the auto focus module 224 to set the focal length of the camera module 202 to a predetermined value (step 302). In one embodiment, the predetermined value of the focal length corresponds to a far distance from the camera system 200. The processor 204 then enables the EDOF module 222 (step 304). Assume that the camera system 200 wants to photograph a target object. The processor 204 then determines whether a distance between the target object and the camera system 200 is less than a threshold distance (step 306). When the distance between the target object and the camera system 200 is greater than a threshold distance, the location of the target object overlaps with the lens-depth-of-field of an EDOF image processed by the EDOF module 222, and the clarity of the target object shown in the EDOF image should be higher than threshold clarity. The processor 308 therefore disables the auto focus module 224 (step 308), and controls the camera module 202 to directly photograph the target object to generate an image (step 310). The processor 204 then controls the EDOF module 222 to process the image according to an EDOF process to generate an EDOF image (step 310).

If the distance between the target object and the camera system 200 is less than the threshold distance (step 306), the location of the target object does not overlap with the lens-depth-of-field of the EDOF image processed by the EDOF module 222. The focal length of the camera module 202 therefore is required to be adjusted to obtain a clear image. The processor 204 therefore uses the auto focus module 224 to perform an auto focus process to adjust the focal length of the camera module 202 (step 312). The camera module 202 then photographs the target object according to the adjusted focal length to generate an image, and the processor 204 then processes the image according to an EDOF process to generate an EDOF image (step 314). The steps 308 and 310 generate a clear image of the target object without an auto focus process delaying the whole photographing process, and the performance of the camera system 200 is therefore improved.

Figure 4:
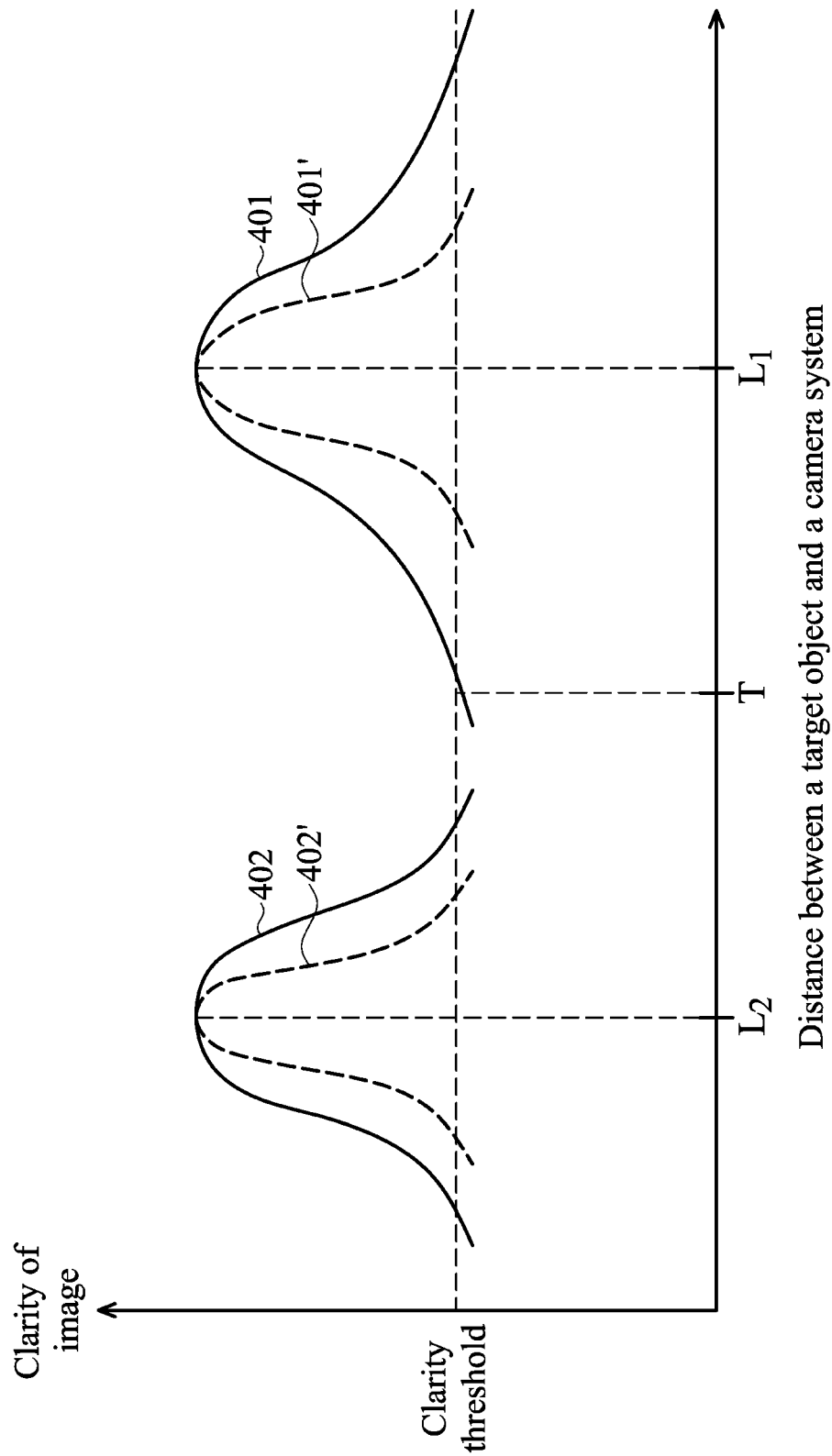
FIG. 4 is a schematic diagram of a relationship between the clarity of an image of a target object and a distance between the target object and the camera system.

Referring to FIG. 4, a schematic diagram of a relationship between the clarity of an image of a target object and a distance between the target object and the camera system 200 is shown. Assume that the predetermined value of the focal length adjusted by the processor 204 at the step 302 corresponds to the location L1. The clarity of the image obtained by photographing a target object according to the predetermined value of the focal length is shown as the curve 401'. If the location of the target object is near the location L1, the image of the target object has a high clarity. The image is processed by the EDOF module 222 to generate an EDOF image. The clarity of the target object shown in the EDOF image is shown as the curve 401. The clarity of the curve 401 is apparently higher than that of the clarity of the curve 401'. Assume that the distance between the camera system 200 and a location of the cross point of the curve 401 and the clarity threshold is T, and T is the threshold distance at step 306. When a distance between the target object and the camera system 200 is greater than the threshold distance T, then the clarity of the target object shown in the EDOF image is higher than that of the clarity threshold. Thus, when the distance between the target object and the camera system 200 is greater than the threshold distance T, the camera module 202 can directly photograph the target object without adjusting the focal length to obtain a clear image of the target object.

When the distance between the target object and the camera system 200 is less than the threshold distance T, then the clarity of the target object shown in the EDOF image is lower than the clarity threshold. The processor 204 therefore must enable the auto focus module 224 to adjust the focal length of the camera module 202. Assume that the location of the target object is at L2. The clarity of the image obtained by photographing the target object according to the adjusted focal length is shown as the curve 402'. The image is processed by the EDOF module 222 to generate an EDOF image. The clarity of the target object shown in the EDOF image is shown as the curve 402. The clarity of the curve 402 is apparently higher than that of the clarity of the curve 402'. Thus, when the distance between the target object and the camera system 200 is less than the threshold distance T, the camera module 202 must adjust the focal length to obtain a clear image of the target object.

Figure 5:
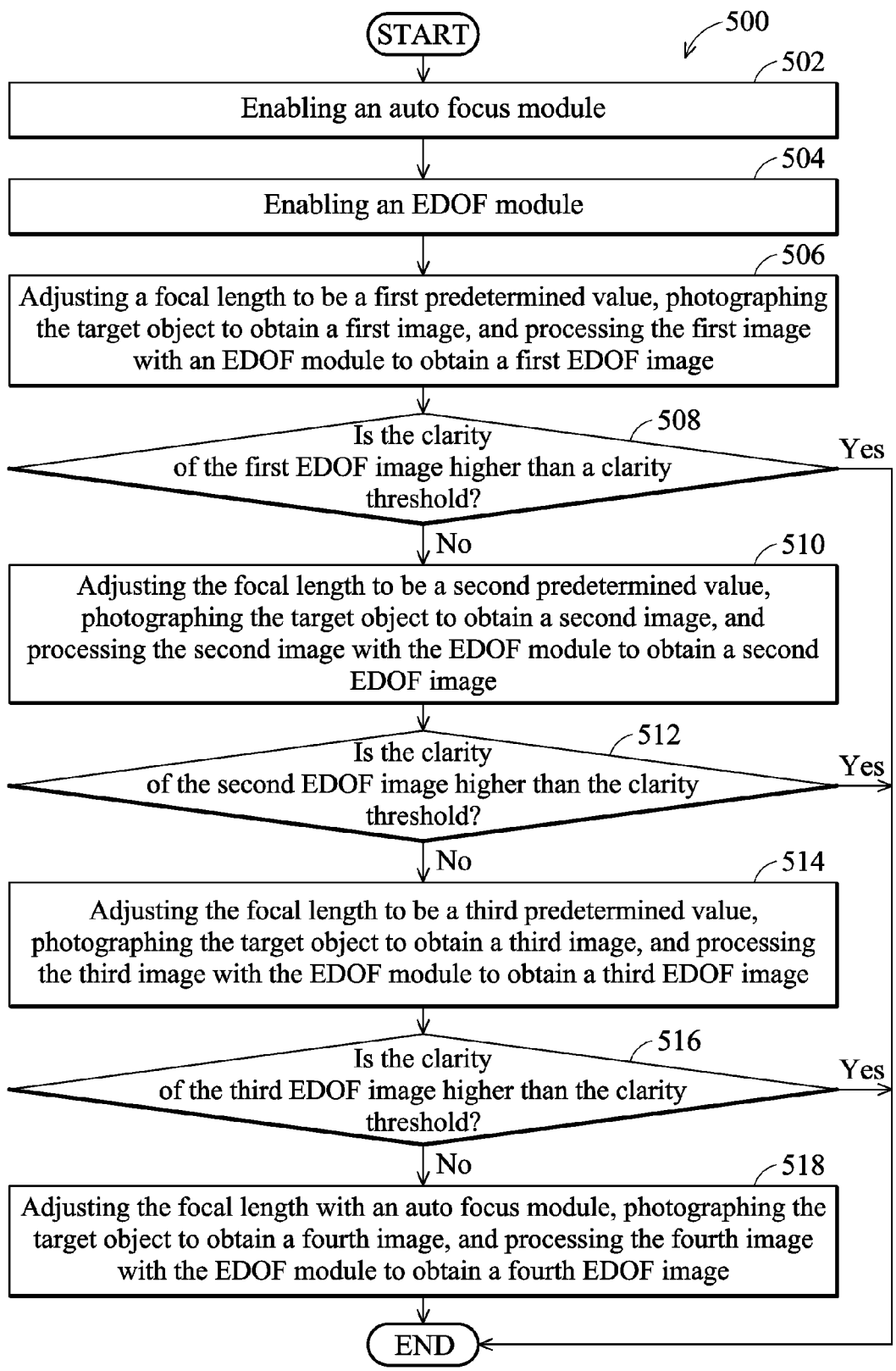
FIG. 5 is a flowchart of a second embodiment of an auto focus method according to the invention.
Figure 6:
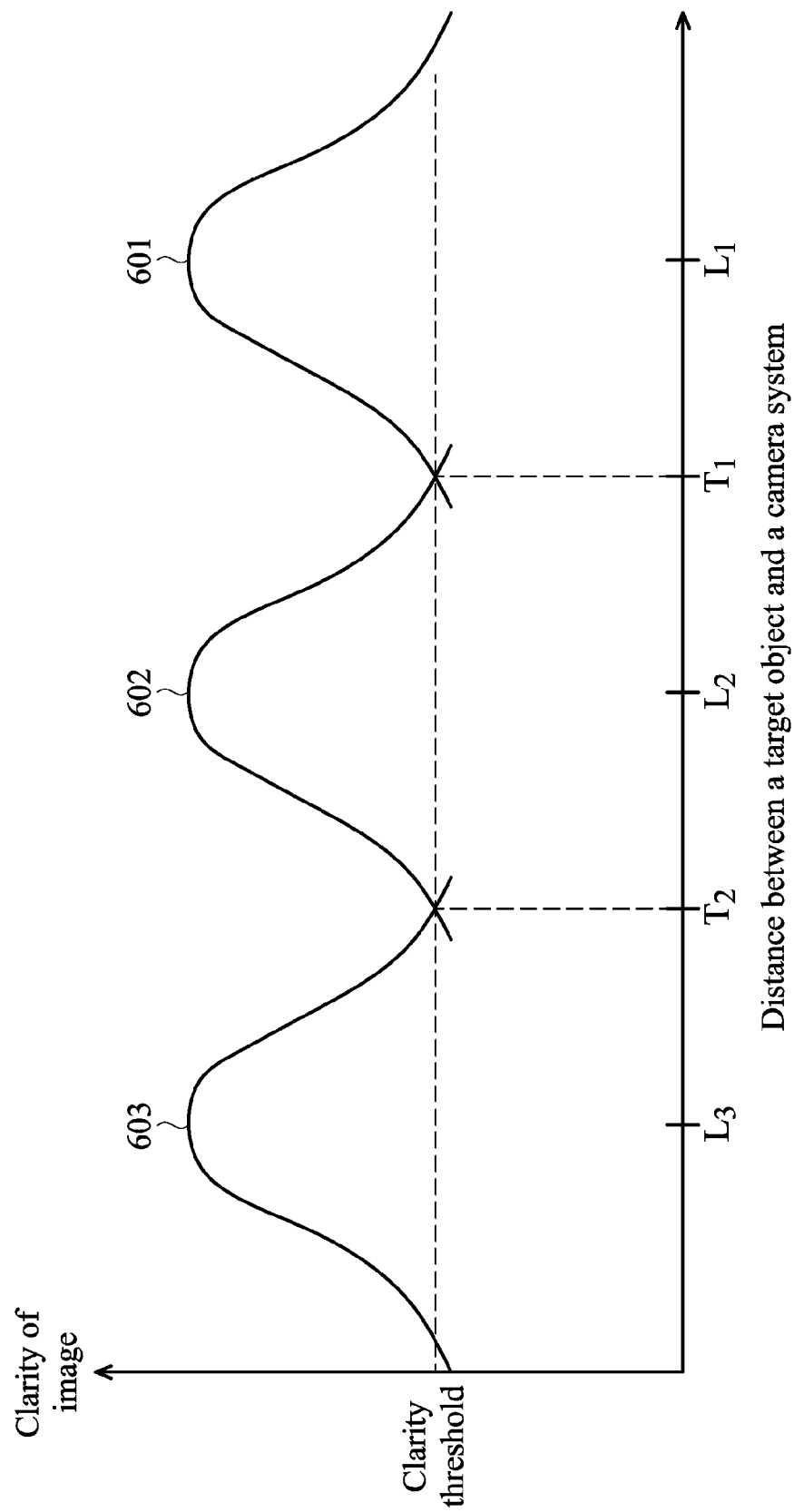
FIG. 6 is a schematic diagram of a relationship between the clarity of an image of a target object and a distance between the target object and the camera system corresponding to FIG. 5.

FIG. 5 is a flowchart of a second embodiment of an auto focus method 500 according to the invention. Assume that the processor 204 classifies a distance between an object and the camera system 200 into a plurality of distance ranges, and sets a plurality of predetermined focal length values respectively corresponding to the distance ranges. Referring to FIG. 6, a schematic diagram of a relationship between the clarity of an image of a target object and a distance between the target object and the camera system 200 corresponding to FIG. 5 is shown. Assume that a distance between a target object and a camera system is divided into 3 distance ranges comprising (1) a first distance range greater than distance T1, (2) a second distance range between distances T1 and T2, and (3) a third distance range less than distance T2. The focus locations of the predetermined focal length values corresponding to the first, second, and third distance ranges are respectively L1, L2, and L3. Assume that when the focal length of the camera module 202 is set to be the predetermined focal length value corresponding to the location L1, then the curve 601 indicates the clarity of objects in an EDOF image generated by the EDOF module 222. Because the cross point between the curve 601 and clarity threshold is T1, when a distance between an object and the camera system 200 is greater than T1, then the clarity of the object shown in the EDOF image is greater than the clarity threshold.

Assume that when the focal length of the camera module 202 is set to be the predetermined focal length value corresponding to the location L2, then the curve 602 indicates the clarity of objects in an EDOF image generated by the EDOF module 222. Because the cross points between the curve 602 and clarity threshold are T1 and T2, when a distance between an object and the camera system 200 is greater than T2 and less than T1, then the clarity of the object shown in the EDOF image is greater than the clarity threshold. Similarly, assume that when the focal length of the camera module 202 is set to be the predetermined focal length value corresponding to the location L3, then the curve 603 indicates the clarity of objects in an EDOF image generated by the EDOF module 222. Because the cross point between the curve 603 and clarity threshold is T2, when a distance between an object and the camera system 200 is less than T2, then the clarity of the object shown in the EDOF image is greater than the clarity threshold.

Referring to FIG. 5, a second embodiment of an auto focus method 500 according to the invention is shown. First, the processor 204 enables the auto focus module 224 (step 502). The processor 204 then enables the EDOF module 222 (step 504). The processor 204 then controls the auto focus module 224 to adjust the focal length of the camera module 202 to be a first predetermined focal length value to focus the image on the location L1 shown in FIG. 6 (step 506). The camera module 202 then photographs a target object according to the first predetermined focal length value to obtain a first image, and the EDOF module 222 processes the first image according to an EDOF process to generate a first EDOF image (step 506). The processor 204 then determines whether the clarity of the target object shown in the first EDOF image is higher than that of a clarity threshold (step 508). If a distance between the target object and the camera system 200 is greater than the distance T1 shown in FIG. 6, then the clarity of the target object shown in the first EDOF image is higher than that of the clarity threshold, and the processor 204 then outputs the first EDOF image.

If the clarity of the target object shown in the first EDOF image is lower than the clarity threshold (step 508), then the distance between the target object and the camera system 200 is shorter than the distance T1 shown in FIG. 6. The processor 204 then controls the auto focus module 224 to adjust the focal length of the camera module 202 to be a second predetermined foal length value to focus the image on the location L2 shown in FIG. 6 (step 510). The camera module 202 then photographs the target object according to the second predetermined focal length value to obtain a second image, and the EDOF module 222 processes the second image according to a EDOF process to generate a second EDOF image (step 510). The processor 204 then determines whether the clarity of the target object shown in the second EDOF image is higher than that of the clarity threshold (step 512). If the distance between the target object and the camera system 200 is shorter than the distance T1 and longer than the distance T2 shown in FIG. 6, then the clarity of the target object shown in the second EDOF image is higher than that of the clarity threshold, and the processor 204 then outputs the second EDOF image.

If the clarity of the target object shown in the second EDOF image is lower than the clarity threshold (step 512), then the distance between the target object and the camera system 200 is shorter than the distance T2 shown in FIG. 6. The processor 204 then controls the auto focus module 224 to adjust the focal length of the camera module 202 to be a third predetermined foal length value to focus the image on the location L3 shown in FIG. 6 (step 514). The camera module 202 then photographs the target object according to the third predetermined focal length value to obtain a third image, and the EDOF module 222 processes the third image according to a EDOF process to generate a third EDOF image (step 514). The processor 204 then determines whether the clarity of the target object shown in the third EDOF image is higher than that of the clarity threshold (step 516). If the distance between the target object and the camera system 200 is shorter than the distance T2 shown in FIG. 6, then the clarity of the target object shown in the third EDOF image is higher than that of the clarity threshold, and the processor 204 then outputs the third EDOF image.

If the clarity of the target object shown in the third EDOF image is lower than the clarity threshold (step 516), the processor 204 then uses the auto focus module 224 to automatically adjust the focal length of the camera module 202 (step 518). The camera module 202 then photographs the target object according to the adjusted focal length to obtain a fourth image, and the EDOF module 222 processes the fourth image according to a EDOF process to generate a fourth EDOF image (step 518). The processor 204 then outputs the fourth EDOF image. The steps 506, 510, and 514 adjusts the focal length of the camera module 202 to predetermined values without using an auto focus mechanism which induces a delay to the photographing process. The time period for generation of the output image is therefore reduced, and the performance of the camera system 200 is therefore improved.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A camera system, comprising:
   a camera module, photographing a target object according to a focal length to generate an image; and
   a processor, comprising:
      an extending-lens-depth-of-filed (EDOF) module, processing the image according to an EDOF process to generate an EDOF image; and
      an auto focus module, adjusting the focal length of the camera module according to an auto focus process,
   wherein the processor classifies a distance between the camera system and an object into a plurality of distance ranges and sets a plurality of predetermined focal length values corresponding to the distance ranges.

2. The camera system as claimed in claim 1, wherein the camera module comprises a lens for improving the clarity of the image.

3. The camera system as claimed in claim 1, wherein when a distance between the target object and the camera system is greater than a predetermined threshold, the processor directly controls the camera module to photograph the target object without adjusting the focal length to obtain a first image, and controls the EDOF module to process the first image to generate a first EDOF image with a clarity higher than that of a clarity threshold.

4. The camera system as claimed in claim 3, wherein when the distance between the target object and the camera system is less the predetermined threshold, the processor controls the auto focus module to automatically adjust the focal length, controls the camera module to photograph the target object to obtain a second image, and controls the EDOF module to process the second image to generate a second EDOF image with a clarity higher than that of the clarity threshold.

5. The camera system as claimed in claim 1, wherein when the focal length of the camera module is set to be one of the predetermined focal length values corresponding to the distance range at which the target object is located, the target object shown in the EDOF image has a clarity higher than that of a clarity threshold.

6. The camera system as claimed in claim 1, wherein the processor adjusts the focal length to be a first predetermined focal length value, the camera module photographs the target object according to the first predetermined focal length value to obtain a first image, the EDOF module processes the first image to obtain a first EDOF image, and the processor outputs the first EDOF image if a clarity of the target object shown in the first EDOF image is higher than that of a clarity threshold.

7. The camera system as claimed in claim 6, wherein if the clarity of the target object shown in the first EDOF image is lower than the clarity threshold, the processor adjusts the focal length to be a second predetermined focal length value, the camera module photographs the target object according to the second predetermined focal length value to obtain a second image, the EDOF module processes the second image to obtain a second EDOF image, and the processor outputs the second EDOF image if a clarity of the target object shown in the second EDOF image is higher than that of the clarity threshold.

8. The camera system as claimed in claim 7, wherein if the clarity of the target object shown in the second EDOF image is lower than the clarity threshold, the processor adjusts the focal length to be a third predetermined focal length value, the camera module photographs the target object according to the third predetermined focal length value to obtain a third image, the EDOF module processes the third image to obtain a third EDOF image, and the processor outputs the third EDOF image if a clarity of the target object shown in the third EDOF image is higher than that of the clarity threshold.

9. An auto focus method, wherein a camera system comprises a camera module, an extending-lens-depth-of-field (EDOF) module, and an auto focus module, the auto focus method comprising:
determining whether a distance between a target object and the camera system is greater than a predetermined threshold;
when the distance between the target object and the camera system is greater than the predetermined threshold, controlling the camera module to directly photograph the target object without adjusting a local length of the camera module to obtain an image;
when the distance between the target object and the camera system is less than the predetermined threshold, after the auto focus module adjusts the focal length of the camera module, controlling the camera module to photograph the target object to obtain the image;
processing the image with the EDOF module according to an EDOF process to generate an EDOF image with a clarity higher than that of a clarity threshold,
wherein the step of when the distance between the target object and the camera system is less than the predetermined threshold, after the auto focus module adjusts the focal length of the camera module, controlling the camera module to photograph the target object to obtain the image further comprises:
classifying a distance between the camera system and an object into a plurality of distance ranges and setting a plurality of predetermined focal length values respectively corresponding to the distance ranges;
selecting a target predetermined focal length value from the predetermined focal length values;
adjusting a focal length of the camera module to be the target predetermined focal length value with the auto focus module; and
photographing the target object to obtain the image with the camera module.

10. The auto focus method as claimed in claim 9, wherein the camera system further comprises a processor, and the processor comprises the EDOF module and the auto focus module.

11. The auto focus method as claimed in claim 9, wherein the camera module comprises a lens for improving the clarity of the image.

12. An auto focus method, wherein a camera system comprises a camera module, an extending-lens-depth-of-field (EDOF) module, and an auto focus module, the auto focus method comprising:
classifying a distance between the camera system and an object into a plurality of distance ranges and setting a plurality of predetermined focal length;
selecting a target predetermined focal length value from the predetermined focal length values;
adjusting a focal length of the camera module to be the target predetermined focal length value with the auto focus module;
photographing a target object to obtain an image with the camera module;
processing the image according to an EDOF process with the EDOF module to obtain an EDOF image; when a clarity of the target object shown in the EDOF image is higher than that of a clarity threshold, outputting the EDOF image; and
when the clarity of the target object shown in the EDOF image is less than that of the clarity threshold, repeating the selecting step, the adjusting step, the photographing step, and the processing step, until the clarity of the target object shown in the EDOF image is higher than that of the clarity threshold.

13. The auto focus method as claimed in claim 12, wherein when the focal length of the camera module is set to be one of the predetermined focal length values corresponding to the distance range at which the target object is located, the clarity of the target object shown in the EDOF image is higher than that of the clarity threshold.

14. The auto focus method as claimed in claim 12, wherein selection of the target predetermined focal length value comprises sequentially selecting the predetermined focal length value corresponding to the distance range far from the camera system to be the target predetermined focal length value.

15. The auto focus method as claimed in claim 12, wherein the camera module comprises a lens with for improving the clarity of the image.

* * * * *